(12) United States Patent
Patrick et al.

(10) Patent No.: US 10,616,126 B2
(45) Date of Patent: Apr. 7, 2020

(54) VIRTUAL CCAP DOWNSTREAM TRAFFIC SCHEDULING

(71) Applicant: Harmonic, Inc., San Jose, CA (US)

(72) Inventors: Michael W. Patrick, Assonet, MA (US); Adam Levy, Hadera (IL); Alex Muller, Pardes Hanna Karkur (IL)

(73) Assignee: Harmonic, Inc., San Jose, CA (US)

( * ) Notice: Subject to any disclaimer, the term of this patent is extended or adjusted under 35 U.S.C. 154(b) by 2 days.

(21) Appl. No.: 15/645,741

(22) Filed: Jul. 10, 2017

(65) Prior Publication Data

US 2018/0013691 A1    Jan. 11, 2018

Related U.S. Application Data

(60) Provisional application No. 62/360,851, filed on Jul. 11, 2016.

(51) Int. Cl.
*H04L 12/867* (2013.01)
*H04L 12/863* (2013.01)

(52) U.S. Cl.
CPC ........ *H04L 47/629* (2013.01); *H04L 47/6215* (2013.01)

(58) Field of Classification Search
CPC ......... H04L 47/22; H04L 47/41; H04L 47/60; H04L 47/6215; H04N 21/6118; H04N 21/6168
See application file for complete search history.

(56) References Cited

U.S. PATENT DOCUMENTS

| | | | |
|---|---|---|---|
| 2007/0263535 A1* | 11/2007 | Shabtay | H04L 12/66 370/230 |
| 2009/0103438 A1* | 4/2009 | Groh | H04W 72/1242 370/235 |
| 2010/0061235 A1* | 3/2010 | Pai | H04L 12/2801 370/230.1 |
| 2010/0061392 A1 | 3/2010 | Iny | |
| 2011/0185263 A1 | 7/2011 | Chapman et al. | |
| 2012/0230196 A1* | 9/2012 | Jain | H04L 47/724 370/235 |

(Continued)

OTHER PUBLICATIONS

International Search Report of International Application No. PCT/US17/41394, dated Nov. 28, 2017.

(Continued)

*Primary Examiner* — Mansour Oveissi

(74) *Attorney, Agent, or Firm* — Brokaw Patent Law PC; Christopher J. Brokaw

(57) ABSTRACT

Scheduling of packets to be forwarded onto DOCSIS downstream channels as part of a Virtual Converged Cable Access Platform (CCAP). A packet to be forwarded onto a DOCSIS downstream channel is enqueued in a service flow queue. The packets stored in the service flow queue are associated with a single service flow. A request is propagated up a hierarchy of schedule elements to a scheduler process to schedule the packet for delivery. The scheduler process determines a grant of how much traffic to offer the DOCSIS downstream channel. The grant determined for the DOCSIS downstream channel may be expressed in units of symbols rather than in bytes. The scheduler process extends a particular grant to the service flow queue by translating symbols in the grant for the service flow queue which issued the request.

9 Claims, 6 Drawing Sheets

(56) References Cited

U.S. PATENT DOCUMENTS

| | | |
|---|---|---|
| 2014/0269314 A1 | 9/2014 | Ozer et al. |
| 2014/0348179 A1 | 11/2014 | Sun et al. |
| 2015/0215217 A1 | 7/2015 | Danzig et al. |
| 2016/0197846 A1 | 7/2016 | Bernstein |
| 2016/0234857 A1* | 8/2016 | Chen ................. H04W 72/1231 |

OTHER PUBLICATIONS

Written Opinion of the International Searching Authority issued in International Application No. PCT/US17/41394, dated Nov. 28, 2017.

* cited by examiner

From highest (SP7) to lowest (SP0) priority:
From the smallest (1-channel) to largest DCS in a given mac domain:

1. Start with a "pending" set of channels set to the channels in the current DCS 2. Calculate a "pending average" by adding the current DCS's reserved bandwidth to the sum of the previously assigned reserved bandwidth in each pending channel and divide by the number of pending channels 3. If any pending channel's previous assignment exceeds the "pending average," remove that channel from the "pending" channel set and repeat Step 2

4. Otherwise, assign the "pending average" to all channels in the remaining "pending" set. If any channel's assignment of reserved bandwidth channel capacity, the current configuration is rejected as infeasible

FIG. 3

VIRTUAL CCAP DOWNSTREAM TRAFFIC SCHEDULING

CLAIM OF PRIORITY

This application claims priority to U.S. provisional patent application Ser. No. 62/360,851, filed Jul. 11, 2016, entitled "Virtual CCAP Downstream Traffic Scheduling," the contents of which are hereby incorporated by reference for all purposes as if fully set forth herein.

FIELD OF THE INVENTION

Embodiments of the invention relate the scheduling of packets to be forwarded onto DOCSIS downstream channels as part of a Virtual Converged Cable Access Platform (CCAP).

BACKGROUND

A Converged Cable Access Platform (CCAP) is a Cable-Labs-led effort that brings technical and operational unity to two projects: The Converged Multiservice Access Platform (CMAP), headed up by Comcast Corp, and Converged Edge Services Access Router (CESAR), headed up by Time Warner Cable Inc.

A virtual Converged Cable Access Platform (CCAP) is software that performs the functions of a hardware-based CCAP. The virtual CCAP may execute on hardware components that include a commercial off-the-shelf switch/router and one or more off-the-shelf computing servers. A commercial example of a virtual CCAP is CableOS, available from Harmonic, Inc. of San Jose, Calif.

Data Over Cable Service Interface Specification (DOCSIS) is a telecommunications standard used to provide Internet access via a cable modem. DOCSIS version 3.0 introduced the concept of a "bonding group." A single data stream for a cable modem (CM) may be sent on a single bonding group (BG) over two or more channels. On the other hand, a single channel may be shared by two or more BGs. Consequently, it is complicated to perform packet scheduling while observing Quality of Service (QOS) obligations given the loose correlation between BGs and RF channels.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 3 is an illustration of an "ice-cube-tray" algorithm for distributing a total concurrent reserved bandwidth of all DCSs among shared channels according to an embodiment of the invention;

DETAILED DESCRIPTION OF THE INVENTION

Figure 1:
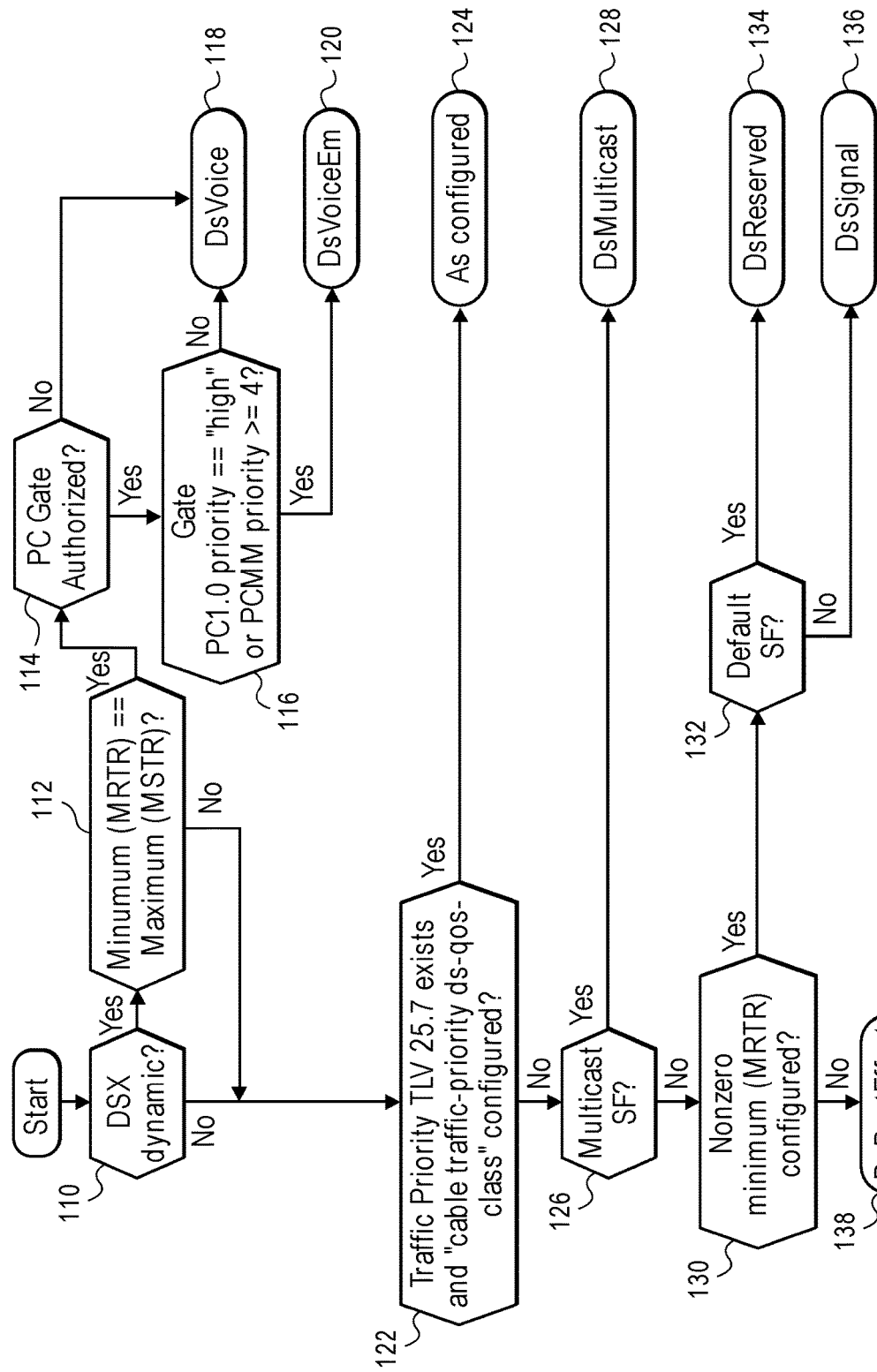
FIG. 1 is a flowchart of the functional steps involved in QOS class assignment according to an embodiment of the invention.

Approaches for the scheduling of packets to be forwarded onto DOCSIS downstream channels as part of a Virtual Converged Cable Access Platform (CCAP) are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards the scheduling of packets to be forwarded onto DOCSIS downstream channels as part of a Virtual Converged Cable Access Platform (CCAP) comprised of an off-the-shelf Core Routing Engine (CRE) and off-the-shelf Core Server computing engines. The scheduling of packets may be performed entirely in software by multiple CPU cores in the Core Servers. Software-based scheduling allows the topology of the scheduling tree to be changed easily for the introduction of new features and requirements.

A downstream packet scheduler of an embodiment may be implemented within a "Traffic Manager" thread that operates within the environment of the Data Path Development Kit (DPDK), which is an Open Source set of libraries and drivers for fast packet processing. Although the DPDK itself also includes a module for scheduling packets, for many reasons, the DPDK scheduler is not optimal for scheduling DOCSIS packets. In particular, the DPDK packet scheduler lacks the concept of bonding groups that overlap on channels.

A Traffic Manager thread consists of two primary functions: enqueuing arriving packets onto per-flow queues, and scheduling the dequeuing of those packets for transmission. Additional description about the Traffic Manager thread, and particularly about the scheduling function, shall be described below.

Embodiments of the invention address and overcome the inherent limitations of the DPDK packet scheduler as shall be explained in greater detail below.

QOS Classes

All DOCSIS service flows are assigned to an entity called a QOS class in embodiments of the invention. A QOS class is an entity that defines common admission control and scheduling parameters in common for all DOCSIS service flows assigned to that QOS Class. For illustration purposes, a non-limiting set of default QOS classes according to an embodiment is depicted below in Table 1.

TABLE 1

| QOS Class Name | Description of associated DOCSIS service flow (SF) |
|---|---|
| DsMaps | a single SF per primary downstream channel for forwarding DOCSIS MAPs |

TABLE 1-continued

| QOS Class Name | Description of associated DOCSIS service flow (SF) |
|---|---|
| DsVoice | one SF for the payload of every normal-priority voice call |
| DsVoiceEm | one SF for the payload of every "emergency" voice call |
| DsAdmin | administrative SFs to carry network management traffic such as ARP and DHCP |
| DsMulticast | DOCSIS "group" service flows for forwarding IP multicast sessions |
| DsReserved | CM default service flows signaled with a Minimum Reserved Traffic Rate |
| DsSignal | CM non-default service flows signaled with a Minimum Reserved Traffic Rate |
| DsBestEffort | all other service flows |

The DsVoice and DsVoiceEm QOS classes are separately defined for admission control only; the service flows assigned to each QOS Class are scheduled in the same weighted fair queuing (WFQ) scheduling element. The FFQ scheduling element shall be described in additional detail below.

Figure 2:
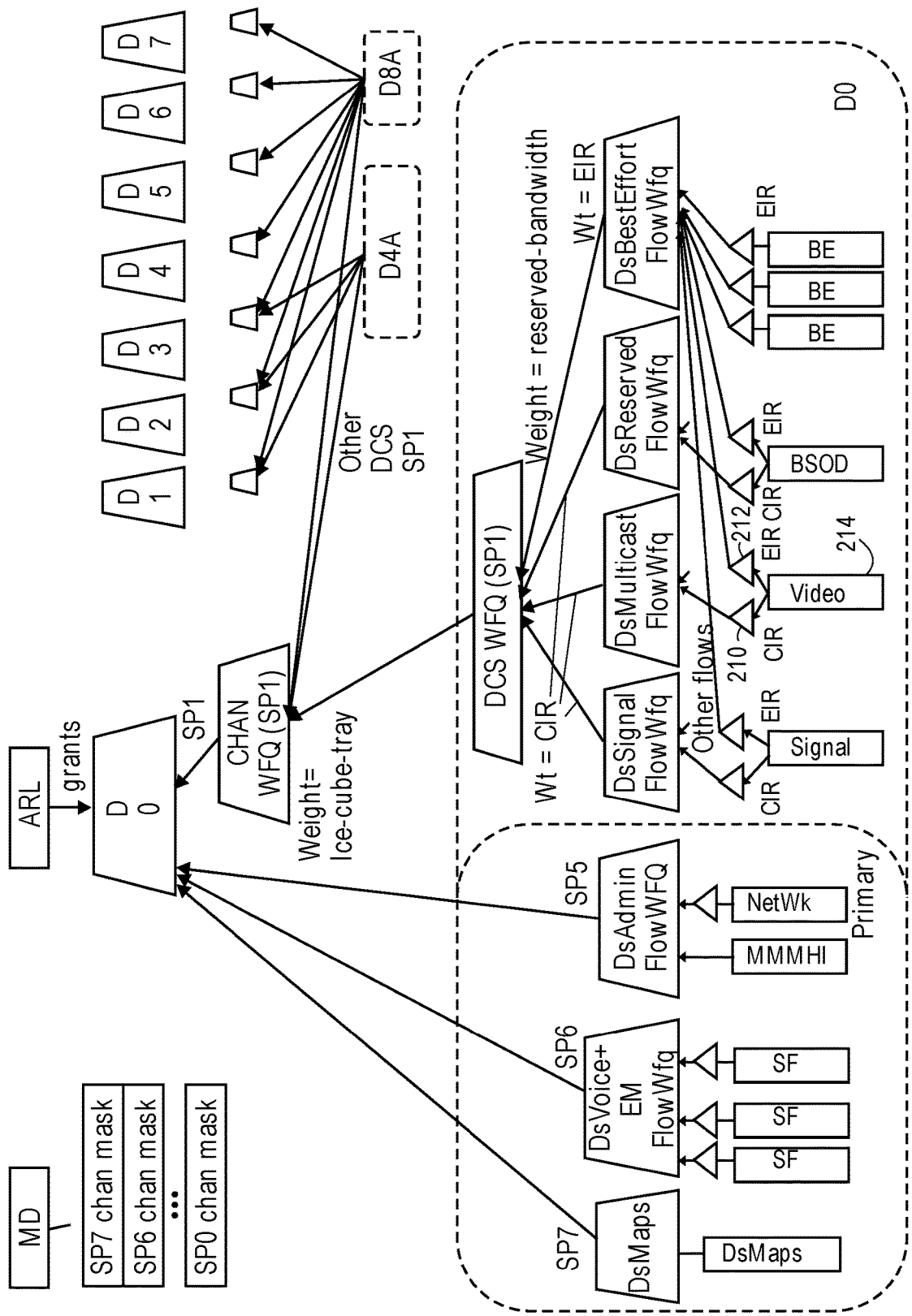
FIG. 2 is an illustration of a topology for scheduling DOCSIS packets with weighted fair queuing of overlapping QCIs according to an embodiment of the invention.

Each DOCSIS SF usually has a token bucket rate limiter defined by a Maximum Sustained Traffic Rate and Maximum Traffic Burst parameter. Examples of this rate limiter are depicted in FIG. 2 as rate limiter 210 and 212, which are depicted above Service Flow 214.

A Downstream Channel Set (DCS) represents either a single downstream channel or a bonding group of multiple downstream channels. A DOCSIS CMTS assigns each SF to a single DCS for scheduling. The DsMaps, DsVoice, DsVoiceEm, and DsAdmin QOS Classes have service flows assigned to a single channel only. All other QOS Classes have SFs that may be assigned to either single-channel or multiple-channel DCSs.

QOS Class Assignment

FIG. 1 is a flowchart of the functional steps involved in QOS class assignment according to an embodiment of the invention. In step 110, a determination is made as to whether the DOCSIS downstream service flow was created by a DOCSIS Dynamic Service Add message. In the determination of step 110 is affirmative, then in step 112 a determination is made as to whether its Minimum Reserved Traffic Rate (MRTR) signaled with Type-Length-Value (TLV) 25.10 equals its Maximum Sustained Traffic Rate (MSTR) signaled with TLV 25.8.

If the determination of step 112 is affirmative, then step 114 is performed. In step 114, a check is performed as to whether a DOCSIS PacketCable so-called "gate" is authorized for the service flow. If it is not authorized, then the flow is classified to the normal priority "DsVoice" QOS Class in step 118. If the flow was authorized with PacketCable, step 116 checks whether the PacketCable gate has "high" priority (for PacketCable 1.0) or with a priority greater than or equal to 4 (of 0-7) for PacketCable MultiMedia (PCMM). If the determination of step 116 is affirmative, then the flow is a constant bit-rate flow that is classified to DsVoiceEm QOS class in step 120. Otherwise, if the determination of step 116 is negative, then the flow is signaled with a normal priority DsVoice QOS class in step 118.

If the determination of step 110 was false, then the flow's DOCSIS Traffic Priority TLV 25.7 is checked. If the TLV is present and a CCAP table is configured to map that Traffic Priority to a particular QOS Class, then the flow is assigned to the mapped QOS Class as shown in step 124.

Otherwise, in step 126, a determination is made to see if the flow is a DOCSIS Group Service Flow for forwarding multicast packets. If the determination of step 126 is affirmative, then the flow is assigned to the DsMulticast QOS Class as depicted in step 128.

Otherwise, if the determination of step 126 is negative, then in step 130 the flow is checked to identify whether the flow has a Minimum Reserved Traffic Rate (MRTR) TLV 25.10 configured. If the determination of step 130 is affirmative, then in step 132, a determination is made as to whether the flow is the so-called "default" downstream service flow for its cable modem, i.e. the first downstream service flow in the CM's configuration file.

If the determination of step 132 is affirmative, then the flow is assumed to be intended for relatively high and bursty throughput, and is assigned to the DsReserved QOS Class as shown in step 134. Otherwise, if the determination of step 132 is negative, then the flow is a secondary downstream flow and is assumed to be intended for relatively infrequent, low-bandwidth traffic, and assigned to the DsSignal QOS Class as shown in step 136. Note that the use of the default vs. secondary position of the service flow to assign by default to high-throughput or low-throughput QOS Classes is unique in the industry. Using a default configuration rule for this distinction is easier for an MSO operator because it obviates other manual configuration mechanisms, e.g. explicit service class names or a table that maps Traffic Priority to QOS Class.

If none of the previous conditions apply, then the flow is assigned to the DsBestEffort QOS Class as shown in step 138.

Downstream Channel Sets

A Downstream Channel Set (DCS) is a set of downstream channels in the same DOCSIS MAC domain. A DCS may contain a single downstream channel or may be a downstream bonding group with multiple channels. A given downstream channel may belong to multiple DCSs. A DOCSIS CMTS assigns a service flow to exactly one DCS at a time. While assigned to a DCS, packets from that service flow are scheduled only on the channels comprising that DCS. Informally, a DCS is sometimes called an "interface," although the DOCSIS standard does not call for bonding groups to be assigned an "interface index" for SNMP reporting purposes.

As used herein, the term "QOS-Class-Interface" (QCI) refers to the scheduling of packets of the service flows from one QOS Class on one DCS, i.e., one interface. Because channels can belong to multiple DCSs, packets from different QCIs must complete against each other for scheduling on the channel.

Embodiments of the invention advantageously allow for dynamic flexible configuration of the topology with which multiple-channel QCIs sharing a channel compete against each other—with either weighted fair queuing (WFQ) or strict priority (SP). Note that in the examples of Table 1, the flexibility of WFQ or SP scheduling applies only to the DsMulticast, DsSignal, DsReserved, and DsBestEffort QOS Classes because they have QCIs that may overlap on a channel; service flows for the other QOS Classes listed in Table 1 are always assigned to a single channel, and hence never overlap.

Embodiments of the invention do not employ an intermediate queue with a DCS. In prior art approaches, as service flow packets are scheduled, the packets are transferred from a service flow queue to a DCS queue. This prior art practice was the only way for the prior art QOS hierarchy (i.e., a hierarchy where higher layers always fully aggregate lower layer) to support the cable industry use of bonding channels and overlapping bonding groups (DCSs). In contrast, embodiments of the invention support any configuration of DCSs (including overlapping DCSs) without the need for any intermediate DCS queues. To do so, embodiments employ a non-aggregating hierarchy, where upper layer elements do not contain all of the next lower layer elements that are connected to the upper layer element.

Downstream Traffic Profiles

Embodiments of the invention employ a "traffic profile" that defines a set of admission control and scheduling parameters for the operation of a QOS Class on a single DCS. The format of an exemplary downstream traffic profile as configured for a particular example is shown below:

```
· cable ds-traffic-profile { traffic-prof-name }
    ds-qos-class ds-qc-name1
    scheduling-priority priority 1..6
    [ concurrent-percent percent ]           - range 0..100, granularity 1,
default 0%
    reserved-bandwidth { kbps kbps | percent percent } }    -- default 0%
range: 0..(10G)
    [ class-rate-limit { none | kbps kbps | percent percent | as_reserved}
\
        burst-msec msec}]]    -- rate percent range 1-100%, default = none,
granularity 1%, kbps range 0-10G
                                 -- burst-msec: default 1, granularity 0.1
range 0.1-100
    [ flow-queue-limit-msec ]                 -- range 0.1 .... 200,
default 50.0, granularity 0.1 msec
    [ assumed-packet-bytes bytes              -- range: 64-1518,
default: 1518
```

A "ds-traffic-profile" is a named set of "ds-qc-profiles." A ds-qc-profile defines a set of parameters for controlling admission and scheduling packets for a single QCI, i.e. a single QOS Class operating on a single DCS. The parameters of a ds-qc-profile are described below in Table 2.

TABLE 2

| Parameter | Description |
| --- | --- |
| scheduling-priority | Selects the strict priority of the grants offered to flows of the QCI. |
| reserved-bandwidth | Specifies the bandwidth of the DCS capacity admitted for the CIR of SFs in the QCI. This is advantageously specified either directly in speed such as kilobits per second or indirectly as a percentage fraction of the DCS RF capacity. |
| concurrent-percent | Specifies the fraction of admitted CIR traffic assumed to be concurrently active, effectively controlling overbooking of CIR. e.g. 25% concurrency permits 4-to-1 overbooking of CIR traffic. |
| class-rate-limit | Specifies the maximum permitted rate of the sum of all SFs in the QCI. This is advantageously configured directly in speed such as kilobits per second, indirectly as a fraction of DCS RF capacity, or as the same as the reserved-bandwidth. |
| flow-queue-limit-msec | Indirectly configures the maximum number of packets permitted on a service flow queue. The count is sufficient to backlog flow traffic consisting of packets of the fixed size "assumed-packet-bytes" scheduled at the flows Maximum Sustained Traffic Rate for the configured "flow-queue-limit-msec" milliseconds. |

TABLE 2-continued

| Parameter | Description |
| --- | --- |
| assumed-packet-bytes | The assumed number of packet bytes of all traffic for purposes of calculating DOCSIS and physical layer overhead and the maximum number of packets enqueued for the service flow. |

The configuration of reserved-bandwidth and class-rate-limit as an absolute speed (e.g. kilobits-per-second) provides direct visibility to the operator of the bit rate, and is appropriate for a traffic profile assigned to a DCS with a known number of channels. The configuration of those parameters as a relative percentage allows the simplicity of defining a single traffic profile that applies to multiple (even all) DCSs, regardless of the number of channels. Customers requiring a numeric minimum bit rate for an application (e.g., 2.0 Mbps per program for HDTV video) can configure using the absolute bit rate without having to "do the math" to configure percentages. The option to use either absolute or relative percentage configuration of bandwidth for QOS profiles, as afforded by embodiments, is certainly unique within the CMTS industry, and indeed is believed by the Applicant to be unique among all computer networking elements.

WFQ Scheduling of Overlapping QCIS

FIG. 2 is an illustration of a topology for scheduling DOCSIS packets with weighted fair queuing of overlapping QCIs according to an embodiment of the invention.

A "Traffic Manager" (TM) thread of the DPDK process repeatedly alternates between reading incoming packets and scheduling outgoing packets. At this point, incoming packets have already been classified to a DOCSIS service flow. The TM thread enqueues the packets on a queue for the particular flow. The TM thread maintains a maximum size of the service flow queue (for tail-drop operation), and may advantageously implement an Active Queue Management (AQM) process to lower the average queue length.

The TM scheduler operates with a "request/grant" mechanism. Incoming packets generate requests that propagate upward in the scheduling elements of a tree. Grants originate at the top of the tree for each channel and are distributed down the tree according to strict priority and weighted-fair-queuing scheduling elements.

The grant to a top-level scheduler is then conceptually offered to lower scheduling elements as depicted in FIG. 2, until the grant reaches a particular DOCSIS Service Flow (SF). Packets are enqueued only in the Service flow queues; the scheduling elements do not contain queues. In the software-based scheduling process of an embodiment, the process of offering a grant to lower schedule elements comprises calling a software subroutine to distribute the grant to a lower level.

Upward Request Propagation

Packets arrive to the TM thread already classified to a service flow. The TM thread enqueues each packet onto a per-SF queue, as shown at the bottom of FIG. 2. Each SF queue is assigned a maximum length designed to hold a configurable number of milliseconds of packets of a configured "assumed-packet-size" arriving at the Maximum Sustained Traffic Rate (MSTR) of the SF. The use of a configured "assumed-packet-size" when configuring maximum SF queue size is believed unique within the CMTS industry. Using a default "assumed-packet-size" of 1518 bytes prevents over-allocation of packet resources to best-effort service flows, while using a smaller assumed-packet-size for voice, map, and control signaling traffic queues prevents under-allocation.

In general, each DOCSIS flow may have a minimum reserved traffic rate (MRTR) as well as a maximum sustained traffic rate (MSTR). This description refers to the configured MRTR as the flow's Committed Information Rate (CIR). The scheduler calculates the Excess Information Rate (EIR) of a service flow as the difference between the maximum and minimum rates, i.e. MSTR-MRTR. The scheduler implements separate token bucket rate limiters for the flow's CIR requests and EIR requests. On any DCS, the scheduler routes requests conforming to the EIR token bucket to the "QCI" for the DsBestEffort QOS Class for that DCS. A service flow may also be connected to more than the two QOS classes DsBestEffort and DsReserved.

A CIR request for a flow (i.e. conforming to its CIR token bucket) is routed to the QOS Class Interface (QCI) scheduling element for that flow. Note that a flow may have both CIR and EIR requests outstanding at a time for the same packet. The burst size of CIR request token bucket is ideally a single maximum length packet; the burst size of the EIR request token bucket is the configured Maximum Traffic Burst of the DOCSIS service flow. As each service flow is visited in the scheduler, its CIR and EIR token buckets are updated.

When a backlogged flow has a request passing its CIR and/or EIR rate limiter, the flow is "announced" to its connected FlowWfq scheduling element, and becomes eligible to receive grants that are offered to the FlowWfq element. The FlowWfq element then "propagates" a request up the scheduling hierarchy. Each scheduling element above the "FlowWfq" level maintains a bit mask of scheduling elements below it that are backlogged.

For example, a request which passes the DsReserved FlowWfq QCI for channel D0 in FIG. 2 logically propagates to the "DCS-SP1 WFQ" element. The scheduler sets a bit corresponding to the DsReserved QOS Class in a bit mask of the DCS-SP1 WFQ. The DCS-SP1 WFQ element in turn logically propagates its request to the CHAN-SP1 WFQ of each channel in the DCS. For each SP level of a Mac Domain, the scheduler maintains a bit mask with a position for every channel. Finally, the CHAN-SP1 WFQ logically propagates its request to the Mac Domain level by setting a bit for SP1 in a per-MD mask.

Downward Grant Offering

For each MAC Domain, the scheduler maintains an 8-bit mask with one position for each SP level. A 1 bit means some schedule element for SP1 in the MD has an eligible request. For each combination of Mac Domain and SP, the scheduler maintains a 256-bit mask with one position for each possible channel in the Mac Domain. A 1-bit indicates some QCI at the SP level has an eligible request pending and a grant to the channel can satisfy that request. The scheduler of an embodiment may visit eligible channels in a round-robin manner. As it visits a channel, the scheduler computes a grant of how much traffic to offer on that channel.

The channel grants (which may be expressed in unit of grants called symbols, as explained below) are limited by a token bucket Aggregate Rate Limiter (ARL) function for each channel that limits the rate of grants to not exceed the channel capacity. The ARL function is depicted in FIG. 2 at the top of the topology. The ARL further limits the burst of outstanding packets to not overflow internal buffers of the Remote Phy Devices (RPDs) that will physically transmit the SCQAM or OFDM RF signals. The default burst time is 1 millisecond of symbols.

As shown with the configuration of FIG. 2, all of the other QOS classes are configured at the same strict priority SP1. SP1 is the next-to-lowest of the Strict Priority (SP) scheduling levels SP0 through SP7. The lowest level SP0 is reserved for "lower than best-effort" service, e.g. background or penalized traffic. In FIG. 2, downstream channel 0 is shared between the single-channel DCS for channel 0, a 4-channel bonding group, and an 8-channel bonding group. The ARL-limited grant for channel 0 at strict priority SP1 is offered to a "Channel WFQ" node labelled as "CHAN WFQ (SP1)," which implements a WFQ process such as Deficit Round Robin to distribute grants to the SP1 QCIs of each DCS sharing the channel.

The weight of each DCS at the CHAN-SPx WFQ scheduling node may be computed based on an "ice-cube-tray" distribution of the total (concurrent) reserved bandwidth among the DCSs sharing that channel. The total concurrent served bandwidth for a DCS is the sum of the concurrent reserved bandwidth for each QCI on that DCS. The concurrent reserved bandwidth for a single QCI is the "concurrent-percent" times "reserved-bandwidth" for QOS class's configured downstream traffic profile for the DCS. The process for distributing the total concurrent reserved bandwidth of all DCSs among shared channels is referred to herein as an "ice-cube-tray" algorithm because it is analogous to the way water flows to cover ice cubes of different height in an ice-cube tray.

FIG. 3 is an illustration of an "ice-cube-tray" algorithm for distributing a total concurrent reserved bandwidth of all DCSs among shared channels according to an embodiment of the invention. Step 2 of FIG. 3 can be thought of as pouring the water of the current DCS's reserved bandwidth into certain ice-cube-tray positions of the pending channels, with the water leveling out to a new average value. If any previously-frozen assignment exceeds the new average, it is an ice cube that sticks out above the average water level, so the process removes that position and repeats the pouring in Step 2 with fewer channels. Otherwise, the ice-cube-tray algorithm freezes the ice cubes at their current average levels. The ice-cube-tray algorithm is run whenever the configuration changes that affects the distribution of concurrent reserved bandwidth, i.e. on changes to downstream traffic profiles or downstream channel sets.

The scheduler permits any grant that reaches a flow to send any length packet, causing its token bucket count to go negative. The scheduler handles the case of a grant for the CIR or EIR requests being offered to a flow with no packets outstanding.

This schedules all outstanding packets of the single-channel QCIs for DsMaps at strict priority SP7, DsVoice+DsVoiceEm at SP6, and DsAdmin at SP6, in that order. The DsVoice and DsVoiceEm packets are scheduled with the same WFQ scheduling node.

RF Symbol Units

To accommodate the implementation of both Single-Carrier QAM (SCQAM) and Orthogonal Frequency Division Multiplexing (OFDM) channels, in an embodiment, the ARL channel grants are computed in the units of symbols, either SCQAM symbols or OFDM sub-carrier symbols. Using symbols as the unit of grants is a unique advantage of embodiments, as all known industry literature describes scheduling requests and grants in terms of units of bytes. Use of symbols for grants is especially helpful for OFDM channel scheduling, where the number of bits per unit time varies with each service flow, or indeed, can vary with each packet. As the channel symbols are propagated to lower schedule elements, each request is translated to the equivalent symbols for the particular service flow making that request.

An RF channel transmits a fixed number of symbols per unit time, but the number of bits represented by each symbol differs depending on the modulation of the symbol. One issue with the WFQ scheduling nodes is whether weighting should be based on the number of bits scheduled or the amount of time (in terms of RF symbols) scheduled. With bit-based scheduling, SFs with the same weight will send the same bits per second under congestion regardless of their OFDM profile modulation. With time-based scheduling, SFs with the same weight will send the same number of symbols per second.

For example, consider two flows with different OFDM modulation rates of 1*B and 2*B bits/sec but otherwise considered "equal" in terms of DOCSIS traffic priority, minimum rate, and maximum rate. In a period of 1 second where both flows offer infinite load, a bits-based scheduler will send from the slower flow for ⅔ of a second, sending 2B/3 bits, while the faster flow will send for ⅓ of a second, also sending 2B/3 bits. The total throughput would be 4B/3 bits.

For a time-based WFQ scheduler, the scheduler allocates equal symbol times for equal WFQ weights. The scheduler would send from each equally-weighted flow for one-half second, or B/2 bits for the slower flow and B bits for the faster flows, for a total of 3B/2 bits. In this case, the aggregate bits sent are higher.

An advantage of a software-based scheduler is that bit-based or time-based WFQ scheduling can be configured as an operator configuration. The scheduler associates each service flow to a particular OFDM profile, i.e. modulation. As each grant of symbols is matched to an SF request, the SF's OFDM profile is used to convert a flows request (in bytes) to the number of granted symbols. The remaining symbols are then offered to other schedule elements. The units of the WFQ decision, e.g. the actual value deducted in a Deficit Round Robin (DRR) process, can be either the symbols or size in bytes of the packets forwarded.

Strict Priority QCI Scheduling

One advantage of software-based scheduling is the ease of dynamically changing the scheduling topology based on customer configuration or even dynamic load conditions.

FIG. 2 depicts an alternate topology for scheduling DOCSIS packets based on strict priority scheduling of the QOS Class aggregates.

Figure 4:
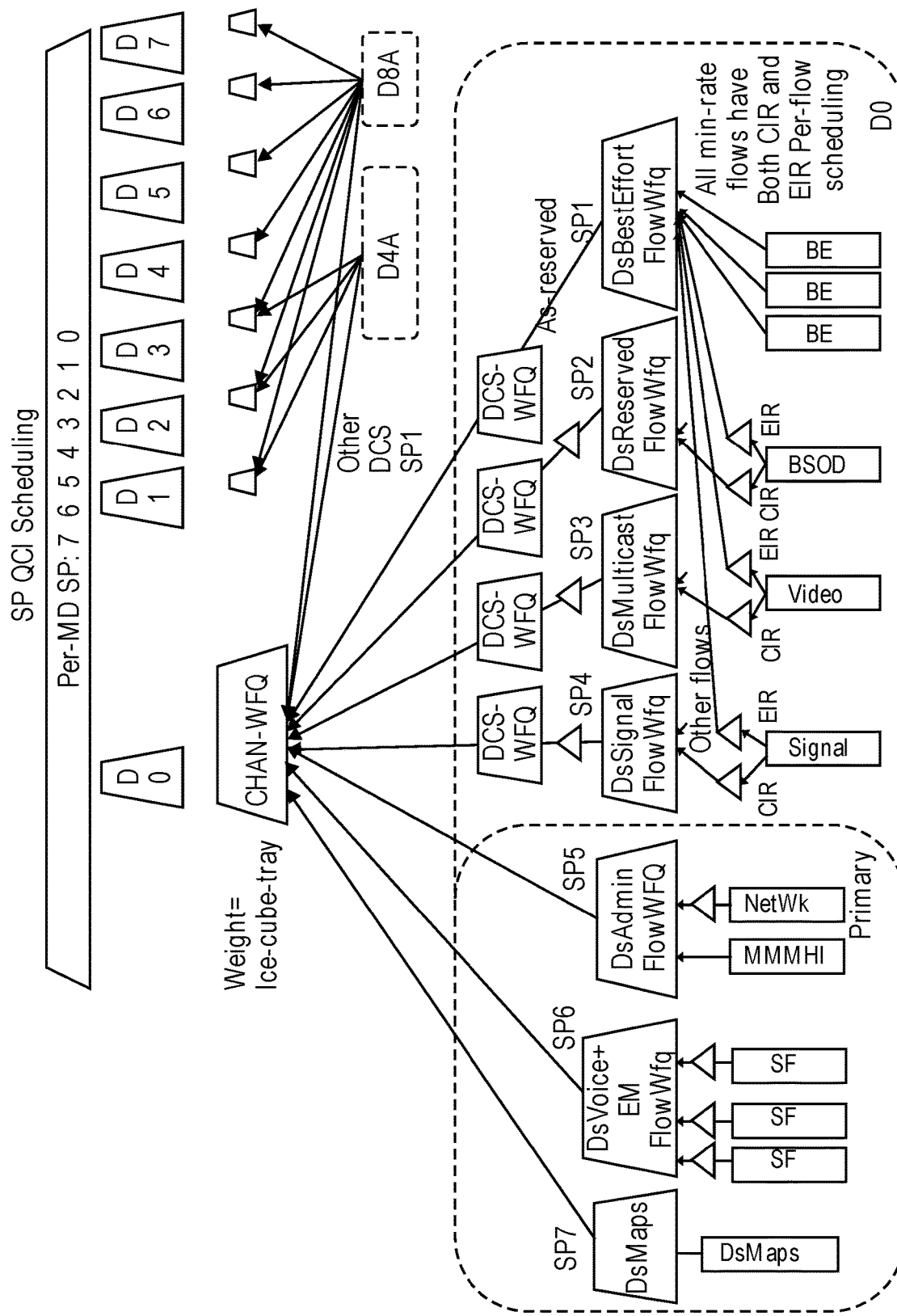
FIG. 4 is an illustration of a topology for strict priority scheduling of QOS classes according to an embodiment of the invention.

FIG. 4 is an illustration of a topology for strict priority scheduling of QOS classes according to an embodiment of the invention. With the topology of FIG. 4, each QOS Class has its own Strict Priority Level. The "DCS-WFQ" scheduling node handles only one QOS class. This case can be recognized and the process changed to skip the DRR processing for the DCS-WFQ level. This demonstrates the flexibility of software-based scheduling.

With Strict Priority WFQ scheduling, overbooked CIR traffic is always permitted to "take" the bandwidth of QCIs with lower priority. To prevent starvation of lower priority QCIs, the "class-rate-limit" parameter of QCI can be configured with "as-reserved" to limit the high-priority scheduling of a QCI to only its non-overbooked configured reserved-rate.

QOS Hierarchy Logical Representation

Figure 6:
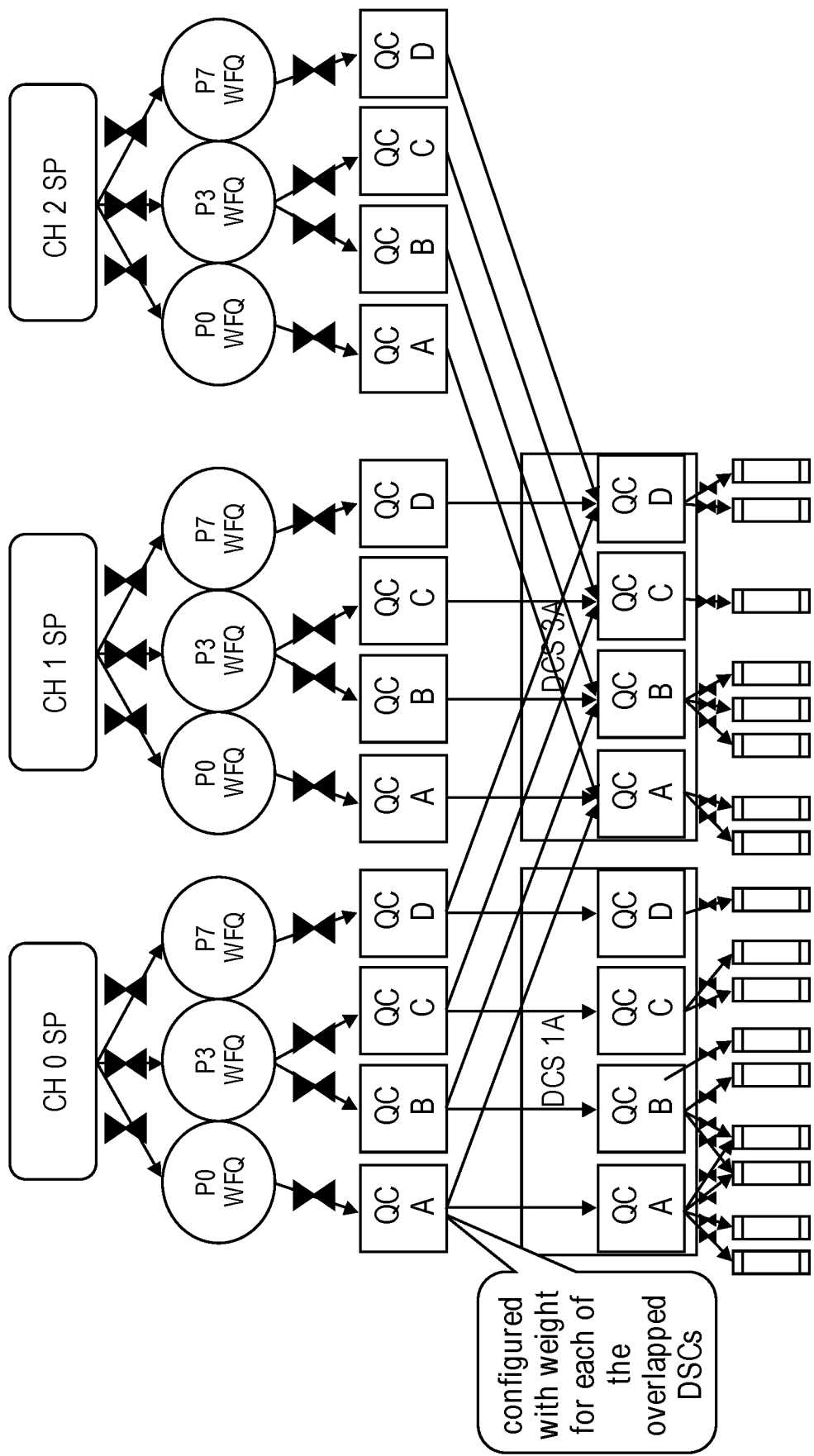
FIG. 6 is an illustration of a QOS hierarchy logical representation according to an embodiment of the invention.

FIG. 6 is an illustration of a QOS hierarchy logical representation according to an embodiment of the invention. Each shown in FIG. 6, each channel holds multiple priorities (usually 0-7). Under each strict priority, there is the priority WFQ which distributes BW to channel level QOS classes according to weight. The intention of this WFQ is to support more than one QOS class being instantiated under the same strict priority. When there is a single QOS class under the channel WFQ, weights are not necessary to determine how BW is distributed.

Each channel level QOS class distributes bandwidth in WFQ fashion to the corresponding QOS class under all of the connected DCSs. Each DCS QOS class distributes BW to all of the SFs connected to it according to their weights. Non-limiting examples of a QOS class include DsVoice, DsReserved, DsAdmin, DsBestEffort, and DsMulticast—but the hierarchy structure is not limited to these exact services or number of QOS classes. A user may define or configure a QOS class in an embodiment as well.

A SF may be connected to more than one QOS class and thus receive BW from two priorities, namely EIR and CIR. Embodiments may support a SF being connected to any number of QOS classes, including three or more QOS classes.

The black hour glass shapes shown in FIG. 6 represent shapers which allow control of maximum rate and maximum burst for (a) Channel (called ARL—aggregate rate limit), (b) Priority under channel, (c) Channel QOS class, (d) SF—separate shaper of SF for each QOS class BW source, and (e) DCS level QOS class.

The logical representation of FIG. 6 may be used to configure CIR percentages per channel instead of per QOS class.

Implementing Mechanisms

Figure 5:
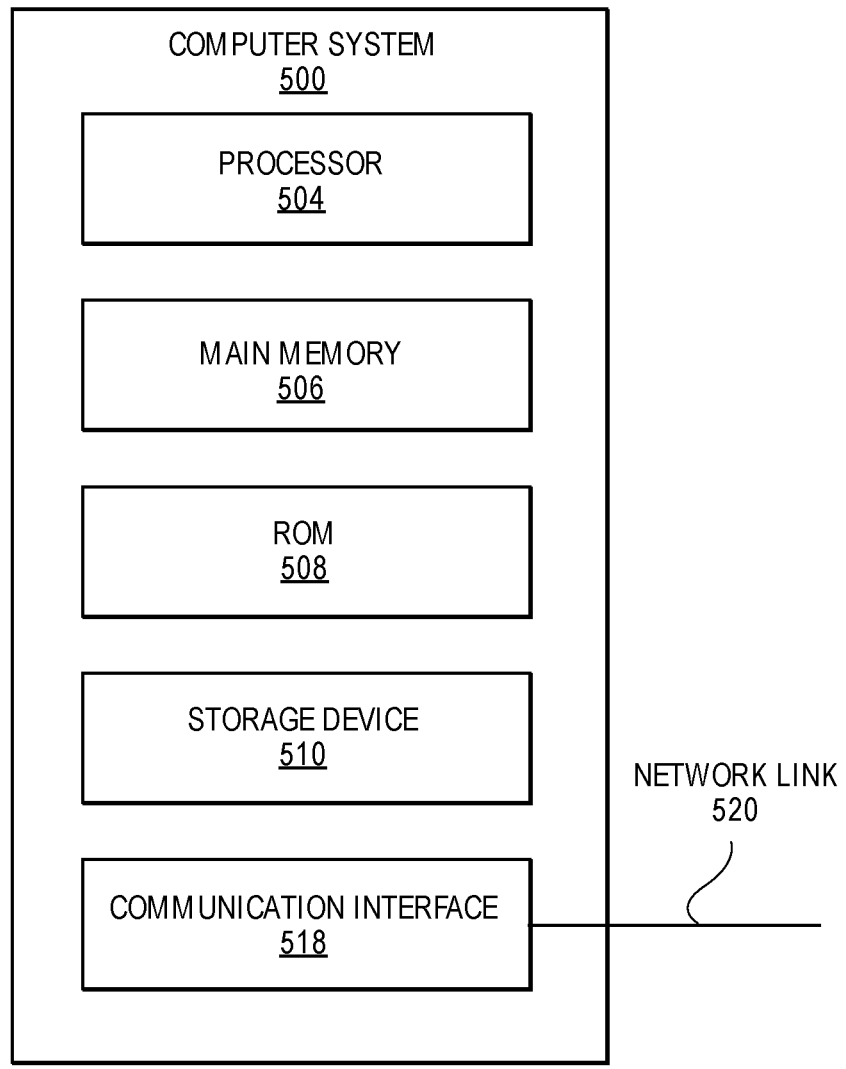
FIG. 5 is a block diagram that illustrates a computer system upon which an embodiment of the invention may be implemented.

Embodiments of the invention enable the scheduling of packets to be performed entirely in software by multiple CPU cores or processors. In an embodiment, the scheduling of packets may be implemented by a computer system. FIG. 5 is a block diagram that illustrates a computer system 500 upon which an embodiment of the invention may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Embodiments of the invention are related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 504 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for scheduling packets to be forwarded onto Data Over Cable Service Interface Specification (DOCSIS) downstream channels, which when executed, cause:
    enqueuing a packet to be forwarded onto a DOCSIS downstream channel in a service flow queue, wherein packets stored in said service flow queue are associated with a single service flow;
    propagating a request up a hierarchy of schedule elements to a scheduler process to schedule the packet for delivery;
    the scheduler process determining a grant of how much traffic to offer the DOCSIS downstream channel,
    wherein the grant determined for the DOCSIS downstream channel is expressed in units of symbols rather than in bytes, wherein a number of bits represented by each of the symbols differs depending upon a modulation of the symbol; and
    the scheduler process extending the grant to the service flow queue by translating symbols in the grant using the modulation of each of the symbols, wherein the modulation of each symbol is based on the service flow queue which issued the request.

2. The non-transitory computer-readable storage medium of claim 1, wherein the scheduler process extending the grant to the service flow queue using a Quality of Service (QOS) hierarchy structure in accordance with a set of weights and priorities indicated thereby.

3. A non-transitory computer-readable storage medium that stores one or more sequences of instructions for scheduling packets to be forwarded onto DOCSIS downstream channels, which when executed, cause:
    enqueuing a packet to be forwarded onto a DOCSIS downstream channel in a service flow queue, wherein packets stored in said service flow queue are associated with a single service flow;
    propagating both a Committed Information Rate (CIR) request and an Excess Information Rate (EIR) request for said packet up a hierarchy of schedule elements to a scheduler process to schedule the packet for delivery, wherein said CIR request and said EIR request for said packet are both outstanding at the same time;
    the scheduler process determining a grant of how much traffic to offer the DOCSIS downstream channel, wherein the grant determined for the DOCSIS downstream channel is expressed in units of symbols rather than in bytes, wherein a number of bits represented by each of the symbols differs depending upon a modulation of the symbol; and the scheduler process extending the grant to the service flow queue by translating symbols in the grant using the modulation of each of the symbols, wherein the modulation of each symbols is based on the service flow queue which issued the request, wherein said translating symbols in the grant is performed differently based on whether the CIR request or the EIR request was satisfied by the grant.

4. An apparatus for scheduling packets to be forwarded onto Data Over Cable Service Interface Specification (DOCSIS) downstream channels, comprising:
 one or more processors; and
 one or more non-transitory computer-readable storage mediums storing one or more sequences of instructions, which when executed, cause:
  enqueuing a packet to be forwarded onto a DOCSIS downstream channel in a service flow queue, wherein packets stored in said service flow queue are associated with a single service flow;
  propagating a request up a hierarchy of schedule elements to a scheduler process to schedule the packet for delivery;
  the scheduler process determining a grant of how much traffic to offer the DOCSIS downstream channel,
  wherein the grant determined for the DOCSIS downstream channel is expressed in units of symbols rather than in bytes, wherein a number of bits represented by each of the symbols differs depending upon a modulation of the symbol; and
  the scheduler process extending the grant to the service flow queue by translating symbols in the grant using the modulation of each of the symbols, wherein the modulation of each symbols is based on the service flow queue which issued the request.

5. The apparatus of claim 4, wherein the scheduler process extending the grant to the service flow queue using a Quality of Service (QOS) hierarchy structure in accordance with a set of weights and priorities indicated thereby.

6. An apparatus for scheduling packets to be forwarded onto DOCSIS downstream channels, comprising:
 one or more processors; and
 one or more non-transitory computer-readable storage mediums storing one or more sequences of instructions, which when executed, cause:
  enqueuing a packet to be forwarded onto a DOCSIS downstream channel in a service flow queue, wherein packets stored in said service flow queue are associated with a single service flow;
  propagating both a Committed Information Rate (CIR) request and an Excess Information Rate (EIR) request for said packet up a hierarchy of schedule elements to a scheduler process to schedule the packet for delivery,
  wherein said CIR request and said EIR request for said packet are both outstanding at the same time;
  the scheduler process determining a grant of how much traffic to offer the DOCSIS downstream channel,
  wherein the grant determined for the DOCSIS downstream channel is expressed in units of symbols rather than in bytes, wherein a number of bits represented by each of the symbols differs depending upon a modulation of the symbol; and
  the scheduler process extending the grant to the service flow queue by translating symbols in the grant using the modulation of each of the symbols, wherein the modulation of each symbol is based on the service flow queue which issued the request,
  wherein said translating symbols in the grant is performed differently based on whether the CIR request or the EIR request was satisfied by the grant.

7. A method for scheduling packets to be forwarded onto Data Over Cable Service Interface Specification (DOCSIS) downstream channels, comprising:
 enqueuing a packet to be forwarded onto a DOCSIS downstream channel in a service flow queue, wherein packets stored in said service flow queue are associated with a single service flow;
 propagating a request up a hierarchy of schedule elements to a scheduler process to schedule the packet for delivery;
 the scheduler process determining a grant of how much traffic to offer the DOCSIS downstream channel,
 wherein the grant determined for the DOCSIS downstream channel is expressed in units of symbols rather than in bytes, wherein a number of bits represented by each of the symbols differs depending upon a modulation of the symbol; and
 the scheduler process extending the grant to the service flow queue by translating symbols in the grant using the modulation of each of the symbols, wherein the modulation of each symbol is based on the service flow queue which issued the request.

8. The method of claim 7, wherein the scheduler process extending the grant to the service flow queue using a Quality of Service (QOS) hierarchy structure in accordance with a set of weights and priorities indicated thereby.

9. A method for scheduling packets to be forwarded onto DOCSIS downstream channels, comprising:
 enqueuing a packet to be forwarded onto a DOCSIS downstream channel in a service flow queue, wherein packets stored in said service flow queue are associated with a single service flow;
 propagating both a Committed Information Rate (CIR) request and an Excess Information Rate (EIR) request for said packet up a hierarchy of schedule elements to a scheduler process to schedule the packet for delivery,
 wherein said CIR request and said EIR request for said packet are both outstanding at the same time;
 the scheduler process determining a grant of how much traffic to offer the DOCSIS downstream channel,
 wherein the grant determined for the DOCSIS downstream channel is expressed in units of symbols rather than in bytes, wherein a number of bits represented by each of the symbols differs depending upon a modulation of the symbol; and
 the scheduler process extending the grant to the service flow queue by translating symbols in the grant using the modulation of each of the symbols, wherein the modulation of each symbol is based on the service flow queue which issued the request,
 wherein said translating symbols in the grant is performed differently based on whether the CIR request or the EIR request was satisfied by the grant.

* * * * *